March 31, 1936.   A. D. BLUMLEIN   2,035,457
SUPPLY OF ELECTRICAL ENERGY TO VARYING LOADS,
FOR EXAMPLE, TO THERMIONIC VALVE APPARATUS
Filed June 13, 1934   2 Sheets-Sheet 1
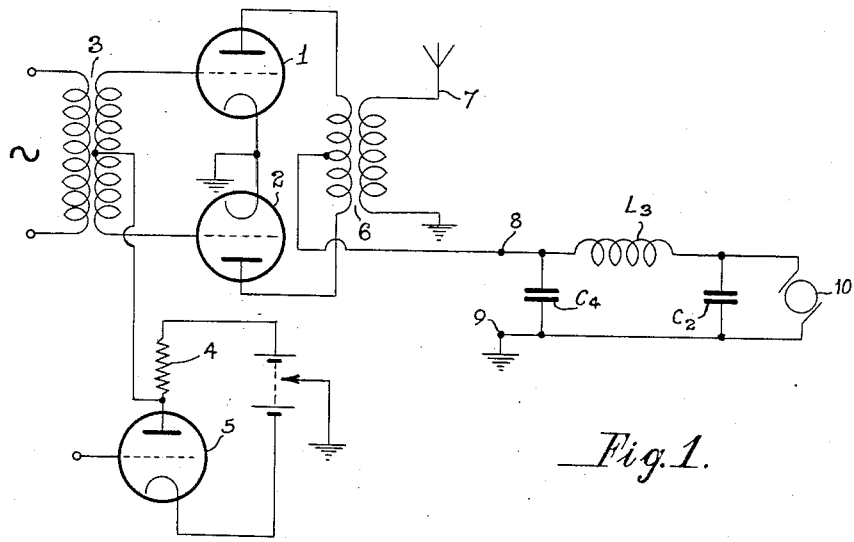
_Fig. 1._
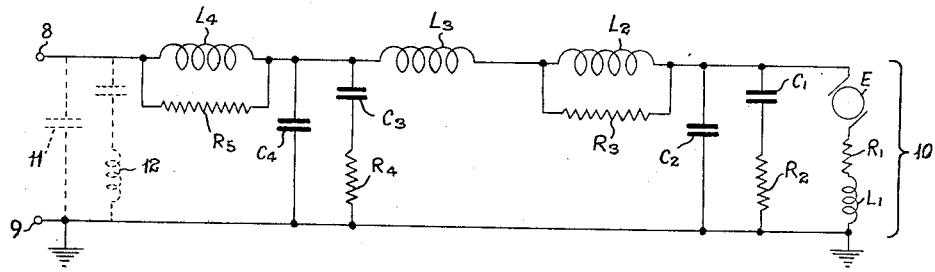
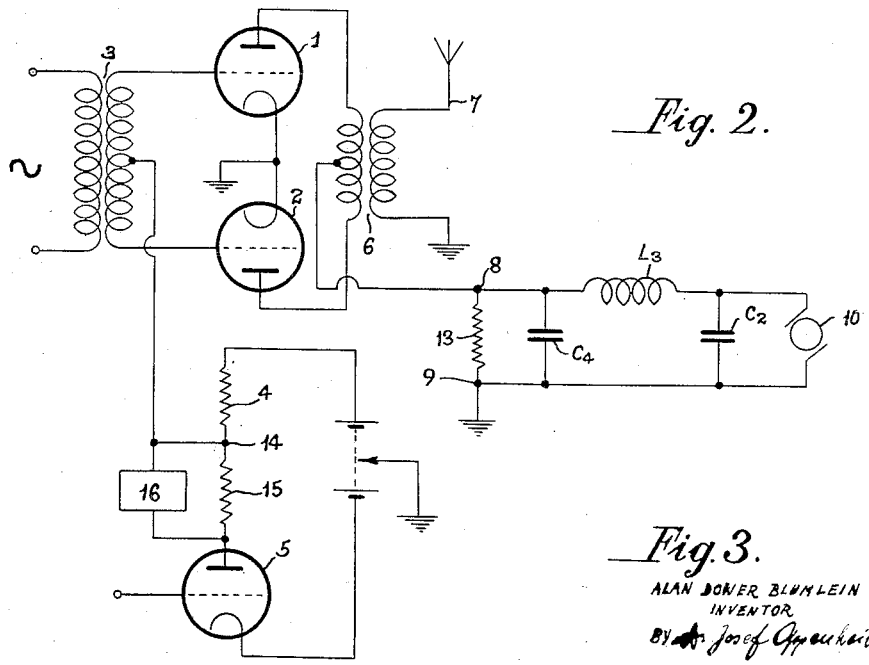
_Fig. 2._
_Fig. 3._
ALAN DOWER BLUMLEIN
INVENTOR
BY Josef Oppenheimer
ATTORNEY March 31, 1936.   A. D. BLUMLEIN   2,035,457
SUPPLY OF ELECTRICAL ENERGY TO VARYING LOADS,
FOR EXAMPLE, TO THERMIONIC VALVE APPARATUS
Filed June 13, 1934   2 Sheets-Sheet 2
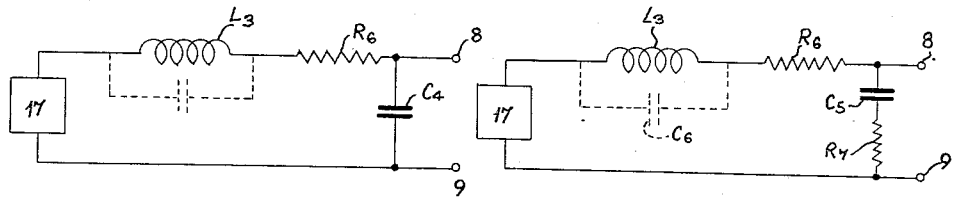
*Fig.4.*   *Fig.5.*
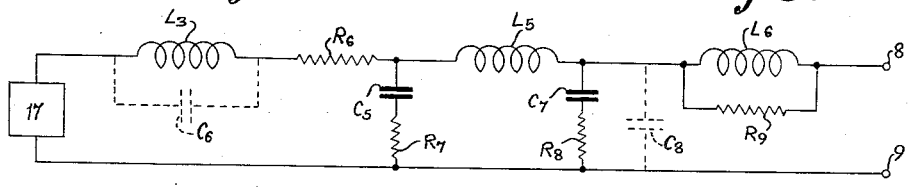
*Fig.6.*
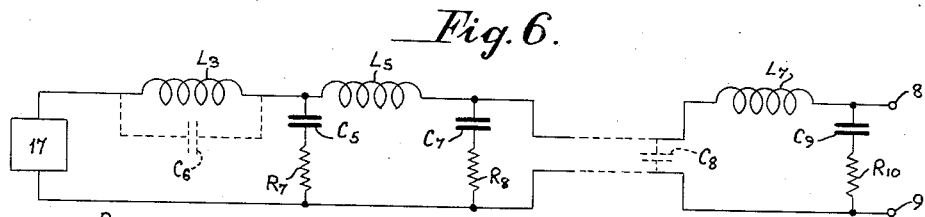
*Fig.7.*
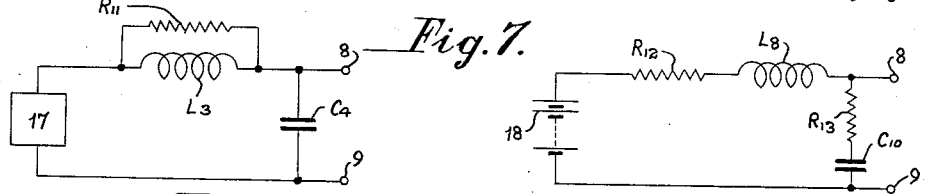
*Fig.8.*   *Fig.9.*
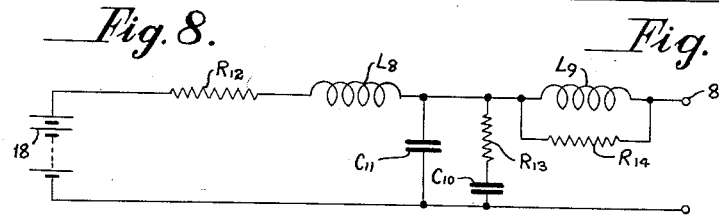
*Fig.10.*
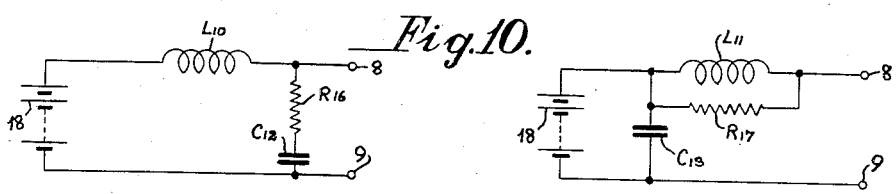
*Fig.11.*   *Fig.12.*
ALAN DOWER BLUMLEIN
INVENTOR
BY
ATTORNEY Patented Mar. 31, 1936

2,035,457

UNITED STATES PATENT OFFICE 2,035,457

SUPPLY OF ELECTRICAL ENERGY TO VARYING LOADS, FOR EXAMPLE, TO THERMIONIC VALVE APPARATUS

Alan Dower Blumlein, Ealing, London, England, assignor to Electric and Musical Industries Limited, Hayes, Middlesex, England, a company of Great Britain Application June 13, 1934, Serial No. 730,537
In Great Britain June 16, 1933

21 Claims. (Cl. 178—44)

The present invention relates to the supply of electrical energy to varying loads, for example to thermionic valve apparatus.

It is common practice to supply electrical energy to thermionic valve apparatus from a generator through a filter circuit. Such a filter circuit may comprise one or more inductances arranged in series and one or more condensers arranged in parallel. The electrical energy is usually taken from the terminals of a condenser of the filter and the size of this condenser is usually made such that it offers negligible impedance to the lowest frequency which the amplifier is to handle.

For some purposes, however, for example in television, apparatus is required to operate at frequencies extending effectively to zero and however large the condenser is made it has been found that the performance of the apparatus is adversely affected by the variation in regulation of the generator together with its filter at different load current frequencies. For example if an amplifier has been operating at a certain D. C. energy level and if this level is then increased, the current supply will momentarily change to its correct value, the condenser of the filter assisting in supplying the increased current, but in due course the current will fall to a lower value because of faulty regulation. If the condenser is made larger, the time taken by the current in falling will be increased but the fall will still take place. The result is that the response of the amplifier is not uniform over the working range of frequencies.

The same effect is noticeable with many other forms of apparatus, such as modulators and demodulators, where oscillations down to effectively zero frequency or where carriers modulated with such oscillations are being handled.

It is an object of the present invention to enable electrical energy to be delivered from a source associated with a reactive impedance to a load which varies at frequencies down to effectively zero without the supply voltage varying with the frequency.

It should be pointed out that the present invention is not concerned with arrangements in which there is provided an auxiliary source of energy, such as a floating battery, which acts as a reservoir of electrical energy and nullifies the effect of reactance associated with the main generator. In effect such arrangements can be regarded as being sources free from reactance since the auxiliary source is free from reactance. For many purposes it is inconvenient to use such auxiliary reactance-free sources and it is for these purposes that the present invention offers considerable advantages.

In the case of a source having small regulation, it may be found that the regulation resistance of the source at low frequencies does not materially affect the operation of the load which it feeds. If however a smoothing circuit is used, the smoothing circuit may resonate at some frequency and so make the effective regulation very large at this frequency.

It is accordingly a further object of the present invention to prevent such large changes in effective regulation.

According to the present invention there is provided apparatus adapted for the supply of electrical energy to a varying load, said apparatus comprising a source of electrical energy and one or more reactive impedance elements either separate from or inherent in said source, wherein means are provided for preventing the reactive component of the regulation impedance of said apparatus, due to said reactive impedance element or elements, from rising to a value which is more than about three times the resistive component of the regulation impedance at any frequency within the range of frequencies over which energy is to be supplied to said load.

Preferably the said means are such that the impedance presented to the load terminals of the apparatus is substantially purely resistive.

According to a further feature of the present invention, in apparatus comprising a source of current associated with an impedance element either separate from or inherent in the source and having one or more reactive components, in which the source serves to supply a load which varies at frequencies down to effectively zero, there is provided a second impedance element also having one or more reactive elements of such nature and so arranged that this second impedance element functions as a mirror image impedance relatively to the first named impedance element.

In one arrangement according to the last paragraph the second impedance element is associated electrically with the source in such a manner that the effective impedance of the source as seen from the load is purely resistive. In an alternative arrangement, the second impedance element is associated with the load or other part of the signal circuit and serves to compensate for the variation in regulation of the source at different frequencies.

According to a further feature of the present invention there is provided apparatus adapted for the supply of electrical energy to a load, said apparatus comprising a source of current of which the regulation impedance is so small as to have no appreciable adverse effect upon the constancy of the voltage maintained across said load over the working range of frequency, a smoothing circuit between said source and the load terminals of said apparatus and damping means of such value as to prevent the regulation impedance of said apparatus as a whole from rising, at any frequency within the working range, to a value exceeding three times and preferably twice the direct current regulation resistance of the apparatus.

Other features of the present invention will be apparent from the following description and the appended claims.

The invention is illustrated by way of example in the accompanying drawings, in which Fig. 1 is a diagram of a known circuit to which the present invention is applicable, Fig. 2 shows a portion of the circuit of Fig. 1 modified to include features of the present invention, Fig. 3 is a circuit diagram similar to Fig. 1 but embodying the present invention, Fig. 4 is a diagram of another known circuit arrangement, Figs. 5 to 8 represent various modifications of the circuit of Fig. 4 embodying the present invention, and Figs. 9 to 12 show further circuits according to the present invention.

Referring to Fig. 1, there is shown a modulator comprising two thermionic valves 1 and 2 arranged in push-pull relation. Carrier frequency oscillations are fed to the grids of the modulator valves through a transformer 3, the centre point of the secondary winding of this transformer being connected to the resistive anode load 4 of the output valve 5 of a low frequency amplifier, the filament of this valve being maintained at a suitable fixed voltage relative to earth. It will be assumed that the signals from this amplifier (which may for example be picture signals in television) contain components of frequencies extending to effectively zero. The anodes of the modulating valves 1 and 2 are coupled by a transformer 6 to an aerial system 7 and the centre point of the primary winding of the latter transformer is connected to the positive terminal 8 of a source of current supply, the negative terminal 9 of the source being connected to the filaments of the modulator valves and to earth.

The source of current supply comprises an electric generator 10 which may be a rectifier of alternating current or dynamo machine or other source of continuous current and, between the generator and the output terminals of the source, a filter. The filter comprises an inductance $L_3$ connected in series, in the example shown in the positive lead, and two condensers $C_2$ and $C_4$ connected between the ends of the inductance $L_3$ and the negative or earth lead.

Considering the voltage of the positive terminal 8 of the source relative to earth, so long as the average value of the low frequency oscillations remains constant, this voltage remains constant because the filter condenser $C_4$ is capable of absorbing any fluctuations. If, however (for example due to a change in general brightness of a picture in television) the signal changes in average value, a change takes place in the average current which the source is required to deliver. Supposing that the source is required to deliver a larger current, then the condenser $C_4$ of the filter will discharge to assist in supplying this increased current. However large the condenser may be it cannot maintain this discharge and consequently the voltage of the point under consideration falls.

One way of overcoming this difficulty according to the present invention consists in making the source, comprising the filter and generator, appear as a pure resistance when viewed from the load (that is to say when when viewed from the load or filter terminals 8, 9). This can be done as shown in Fig. 2, which shows the circuit of Fig. 1 to the right of the load terminals 8, 9 modified according to the invention.

The generator 10 of Fig. 1 can be regarded as a source of electromotive force E in series with a resistance $R_1$ and an inductance $L_1$, the resistance $R_1$ being the effective D. C. regulation resistance of the generator. It is known that the reactive properties of such a circuit can be completely annulled by connecting in parallel therewith a condenser $C_1$ and a resistance $R_2$ in series, so long as the value of this resistance equals $R_1$ and the value $C_1$ of the condenser is such that $$\frac{L_1}{C_1}=R_1^2$$

The impedance element comprising $C_1$ and $R_2$ is known as the mirror image impedance of the element comprising $L_1$ and $R_1$. A suitable condenser $C_1$ and resistance $R_2$ are therefore connected in this way and the effective impedance seen from the terminals of the condenser $C_2$ looking back into the generator is therefore a resistance of value equal to $R_1$ The first condenser $C_2$ of the filter is thus effectively in parallel with a resistance $R_1$ and, as is also known, the mirror image impedance thereof is an inductance $L_2$ in parallel with a resistance $R_3$, such that $$R_3=R_1 \text{ and } \frac{L_2}{C_2}=R_1^2$$

this circuit $L_2$ $R_3$ being arranged as a series element in the filter circuit. The whole circuit so far considered comprising elements $L_1$, $R_1$, $R_2$, $C_1$, $C_2$, $L_2$ and $R_3$ behaves as a resistance of value $R_1$. This resistance is effectively in series with the inductance $L_3$ of the filter and to annul this reactance a mirror image circuit comprising a condenser $C_3$ in series with a resistance $R_4$ is shunted across the filter, as before the values being such that $$\frac{L_3}{C_3}=R_1^2 \text{ and } R_4=R_1$$

Similarly the final condenser $C_4$ of the filter which is in parallel with the effective resistance of the remainder of the circuit, namely $R_1$, is compensated for by a series inductance $L_4$ having a resistance $R_5$ in parallel therewith, $$\frac{L_4}{C_4}$$

being made equal to $R_1^2$ and $R_5$ being made equal to $R_1$.

Thus the whole source including the generator and the filter associated therewith can in the manner above described be made to simulate a pure resistance at all frequencies down to and including zero frequency and the regulation of the source will then be independent of the frequency of the load current. If desired a small condenser shown in dotted lines at 11 or an asceptor circuit shown in dotted lines at 12 may be bridged across the end of such a filter circuit to by-pass the carrier frequency currents without upsetting the impedance of the smoothing system for modulation frequencies. It may be necessary in practice to represent the impedance of the source as a more complex network than $R_1$ and $L_1$ described above, in which case the first shunt circuit may be more complex than the $C_1$ and $R_2$ of this example. Similarly it may be necessary to increase the constant resistance to which the final filter is built out to allow for the D. C. resistance of smoothing inductances.

In an alternative method of achieving a similar result according to this invention illustrated in Fig. 3, correction for the reactive impedance of the source 10 is applied to the load circuit itself, for example to the anode circuit of the output valve 5 of the low frequency amplifier in the case above described. In Fig. 3 like elements are given the same references as in Fig. 1. In order to permit of this correction taking place, it is necessary to arrange that the impedance of the source viewed from the load (that is the impedance seen from load terminals 8 and 9 looking to the right) shall have a finite maximum value. In the case considered, using a generator 10 followed by a filter comprising a series inductance $L_3$ and two parallel condensers $C_2$ and $C_4$, this is achieved by providing a resistance 13 in parallel with the output terminals 8, 9 of the source. The maximum value of the effective impedance of the source is then the value of the resistance 13, which may be large if desired.

There is then arranged in series between the anode of the amplifier valve 5 and the terminal 14 of its resistive anode load 4, a compensator resistance 15 having a value equivalent to that of the resistance 13 across the source, taking into consideration the voltage magnification occurring between the two points. That is to say that the insertion of compensator resistance 15 will produce as great a loss in modulated transmitter output as would be produced by changing the smoothing circuit impedance from zero to the value of the resistance 13 across the source. Across the compensator resistance 15 is then connected a circuit represented diagrammatically at 16 which is element by element the mirror image of the filter circuit $C_4$, $L_3$, $C_2$ and generator 10, the elements having values proportioned to the compensator resistance 15 and the circuit in which they operate, so that the effect of the variable impedance supply circuit is neutralized for all modulation frequencies down to effectively zero frequency. This compensation may, if preferred, be made at any other point in the modulation frequency transmission circuit, and may also be performed by shunt circuits, or both shunt and series equalizer circuits.

In a combination of the two arrangements described, the source is corrected according to the method shown in Fig. 2 and is thus made to simulate a pure resistance, a large condenser is shunted across the output of the source (for example condenser 11 may have a large value), and this effective combination of condenser in parallel with a resistance is compensated for by connecting an inductance in parallel with the resistance 15 in the anode circuit of the amplifier valve 5. The inductance and shunt resistance are, as before, made to act as mirror image impedances relatively to the condenser and shunt resistance of the source.

In all cases the loss in transmission efficiency entailed by either neutralizing or compensating the variable impedance of the filter circuit may be reduced by arranging the generator to have the minimum possible D. C. regulation as may be done by compounding a dynamo generator.

It may be found in some cases where the source is required to simulate very closely a pure resistance or, if the correction for the variation in regulation of the source is applied to some part of the load circuit, where this correction is required to be very nearly complete, account has to be taken of stray reactances, such for example as the self-capacity of inductances, the inductance of condensers and the capacity of the wiring. For example in the known circuit shown in Fig. 4, as source 17, which may be a rectifier, is connected to load terminals 8 and 9 through a filter comprising a series inductance $L_3$ and a shunt condenser $C_4$. The resistance of the source 17 and the inductance $L_3$ is represented by $R_6$. At very low frequencies this source when viewed from terminals 8 and 9 will have an impedance $R_6$ and at high frequencies it will have a low impedance due to $C_4$. At the resonant frequency of $L_3$ and $C_4$ it may have quite a high value. By applying the present invention to this circuit as shown in Fig. 5 the impedance may be made much more nearly constant. In Fig. 5 the condenser $C_4$ is replaced by a condenser $C_5$ in series with a resistance $R_7$ so proportioned that $$R_7 = R_6 \text{ and } \frac{L_3}{C_5} = R_6^2.$$

If this arrangement involves an inconveniently high value of $C_5$ the value of $L_3$ may be reduced or the D. C. regulation may be artificially increased by inserting resistances in series with the rectifier.

It will be seen that with this circuit of Fig. 5 the impedance seen from the load terminals 8, 9 will at very low frequencies be determined by the rectifier branch $R_6$, $L_3$, 17 and at high frequencies by the shunt branch $C_5$, $R_7$. At a frequency $f_1$ given by $$f_1 = \frac{1}{2\pi\sqrt{L_3 C_5}}$$

the impedance will be determined equally by both branches. Now, at frequencies well above $f_1$ the impedance of the arrangement will not be seriously altered if the impedance of the rectifier branch departs from that represented by an inductance $L_3$ in series with a resistance $R_6$ provided that the impedance of this branch remains high. Suppose now that the inductance $L_3$, which may consist of very many turns of wire, has a self capacity $C_6$ indicated by the condenser in dotted lines. At some frequency above the resonant frequency of $L_3$ and $C_5$, this capacity $C_6$ may cause the impedance of the rectifier branch to become quite comparable with $R_7$, thus upsetting the constancy of impedance of the combination. The frequency at which this may occur will be called $f_2$.

The bad effects of $C_6$ may be avoided according to a feature of this invention as shown in Fig. 6 by connecting between the junction point of the rectifier and shunt branches and the output terminal 8 an inductance $L_5$ of low self capacity compared with $L_3$ and by connecting a further resistance $R_8$ and condenser $C_7$ across the output terminals, where $$\frac{L_5}{C_7} = R_8^2 \text{ and } R_8$$

is made equal to $R_6$ plus any additional regulation resistance introduced by $L_5$. Further, the critical frequency $$f_3 = \frac{1}{2\pi\sqrt{L_5 C_7}}$$

above which the branch $C_7$, $R_8$ substantially determines the impedance is made lower than $f_2$ so that the harmful effects of the self capacity $C_6$ are masked by the filtering action of $L_5$ and $C_7$.

Similarly, the arrangement thus obtained may not be perfect due to the self capacity of $L_5$ or due to the inductance or capacity or both of the wiring from the output terminals of the shunt branch $C_7$, $R_8$ to the load, that is to the point at which the D. C. power is required. A capacity, as might be produced by wiring is shown in dotted lines at $C_8$. Such a capacity would at very high frequencies alter the impedance seen from the terminals 8, 9 of Fig. 6. The effect of this shunt capacity $C_8$ may be neutralized by inserting an inductance $L_6$ shunted by a resistance $R_9$ in series with the wiring to the load terminal 8, the terminals 8 and 9 being disposed close to the load. The value of $L_6$ is fixed from the value of $C_8$, which depends on the constants of the wiring. Similarly, the wiring may be loaded by series inductances to the same resistive impedance as that to which the regulation of the smoothed source has been adjusted.

In an alternative arrangement for correcting for the capacity $C_8$ shown in Fig. 7 there is provided in series in one lead of the wiring and close to the load an inductance $L_7$. A circuit comprising a resistance $R_{10}$ in series with a condenser $C_9$ is shunted across the load terminals 8, 9. The arrangement is made such that $$\frac{L_7}{C_9} = R_{10}^2 \text{ and } R_{10}$$

equals the regulation resistance to which the source has been built out plus any additional regulation resistance due to the wiring and the inductance $L_7$. The critical frequency $$f_5 = \frac{1}{2\pi\sqrt{L_7 C_9}}$$

is so chosen that it is lower than the frequency at which $C_8$ begins to affect materially the regulation resistance. As $f_5$ will probably be a comparatively high frequency, the magnitude of $L_7$ and $C_9$ will probably be small so that they may easily be arranged as stated at the point where the D. C. power is to be applied.

The circuit as a whole now comprises a succession of constant resistance circuits of decreasing inductance and capacity values (proceeding from the rectifier 17) employing inductive series elements and resistive and capacitative shunt elements. The general principle is that a primary source such as a rectifier has over a frequency range $O-f_1$ a regulation resistance which may be represented by a resistance, or by a resistance in series with a simple impedance network. This rectifier is built out to a constant resistance by suitable resistance and reactance elements which mask the primary source impedance for frequencies above $f_1$ and at the same time make the resultant built out source appear to be a constant resistance over a frequency range $O-f_2$, where $f_2 > f_1$. Further, similar stages may be required in order to obtain sufficient smoothing. However, it may be impossible or inconvenient to construct the elements or lay-out of the first section of build out so that $f_2$ is as high a frequency as is required, and in such a case a second stage of build out is arranged so that the impedance of the first stage is masked at frequencies above $f_2$, and so that the resistance is maintained constant over a range $O-f_3$. Similarly the combined arrangement may be built out again to reach a frequency $f_4$ and so on.

As already stated, in the case of a source having small regulation, it may be found that the regulation resistance of the source at low frequencies does not materially affect the operation of the load which it feeds. If however, a smoothing circuit is used, the smoothing circuit may resonate at some frequency and so make the effective regulation very large at this frequency. For example, in the circuit shown in Fig. 4, if the regulation resistance of the rectifier 17 is small compared with the reactance of $L_3$ or $C_4$ at the frequency where they resonate, the impedance seen from the output terminals 8, 9 will, at frequencies close to resonance, be very many times the D. C. regulation resistance of the source.

This difficulty can be overcome according to a feature of this invention by the provision of suitable damping means so arranged as to prevent the regulation impedance from rising to an unduly high value.

Thus in the circuit of Fig. 5, assuming that the source 17 is one having a very low regulation resistance, a resistance $R_7$ may be arranged in series with the condenser $C_5$. The value of this resistance $R_7$ and the value of $L_3$ and $C_5$ need not in this case be proportioned, as already described in connection with this figure, so as to build the smoothing circuit to a constant resistance provided that enough damping is added to prevent the regulation of the smoothed source being sufficient at any frequency to affect adversely the operation of the device which it feeds. Alternatively to putting a resistance in series with $C_1$, a resistance $R_{11}$ may be put in parallel with $L_3$ as shown in Fig. 8. The insertion of damping resistances into the filter will necessarily reduce its smoothing efficiency, especially for the higher ripple frequencies, or conversely it will be necessary to increase the sizes of the inductances or condensers or both or to increase the number of filter sections in order to obtain the same degree of smoothing. Alternative methods of achieving the same results are so to proportion the condenser conductors or the laminations of the chokes as to introduce effective damping into these components.

Thus the damping, while reducing the smoothing efficiency of the filter, serves to limit the range of variation of regulation impedance. This arrangement is in effect a step towards building the filter to a pure resistance, but the resistances (or damping) introduced, and the values of the components used, are not necessarily adjusted to the exact values for a constant resistance system. Sufficient damping is introduced to prevent any resonances from causing the regulation impedance at any frequency to be much greater than (that is to say more than two or three times) the D. C. regulation resistance.

An alternative to the above arrangement is obtained by so proportioning the smoothing elements that, compared with the regulation resistance of the primary source, they present to the load at their resonant frequency or frequencies a low impedance, that is to say an impedance which is not more than about twice the regulation resistance of the primary source.

When a source of direct current having very small regulation impedance is required, an accumulator battery is often used. The regulation of such a battery may sometimes be of importance and if it is desired to operate over a very wide range of frequencies, the variation with frequency of the regulation of the battery may also be of importance. Similarly the battery may have attached to it or be connected through wiring, whose inductance and/or capacity is sufficient to cause the effective regulation to alter with variation of frequency.

In order to correct the variations of regulation impedance, the battery may be built out to look like a pure resistance.

The impedance of the battery may be measured over the whole frequency range through which it must operate. The impedance may be found to approximate to the impedance of a certain electrical network. The battery is then built out by the inverse of this network, that is by a mirror image network, so as to present a constant resistive regulation at all frequencies. For example, as shown in Fig. 9, the battery 18 may be found to approximate to a resistance $R_{12}$ in series with an inductance $L_8$. The battery is then shunted by a resistance $R_{13}$ and a condenser $C_{10}$ arranged in series and having such values that $$\frac{L_8}{C_{10}} = R_{12}^2 \text{ and } R_{12} = R_{13}$$

Similarly, as shown in Fig. 10, the battery 18 may be found to approximate to a resistance $R_{12}$ in series with an inductance $L_8$, the whole being shunted by a condenser $C_{11}$. The battery may then be shunted by $R_{13}$ and $C_{10}$ in series, where $$\frac{L_8}{C_{10}} = R_{12}^2 \text{ and } R_{12} = R_{13}$$

and there is added a series element consisting of $L_9$ in parallel with $R_{14}$, where $$\frac{L_9}{C_{11}} = R_{12}^2$$

Similar circuits can be devised for almost any possible configuration of elements found to approximate to the battery impedance, or to the impedance of the battery and the wiring from the battery to the point at which it is required to operate.

As a second alternative, it may be found that up to and a little above a frequency $f_1$, the regulation of the battery and its wiring approximates to a constant pure resistance equal to say $R_{15}$. An inductance $L_{10}$ is then connected in series with the battery 18 and the resultant circuit is shunted by a resistance $R_{16}$ and a capacity $C_{12}$ in series, where $$\frac{L_{10}}{C_{12}} = R_{16}^2, \frac{1}{2\pi\sqrt{L_{10}C_{12}}} = f_1$$

and where $R_{16}$ equals $R_{15}$ plus the resistance of $L_{10}$. Alternatively, as shown in Fig. 12, the battery 18 may be shunted by a condenser $C_{13}$ and built out by an inductance $L_{11}$ in parallel with a resistance $R_{17}$. In either of these cases of Figs. 11 or 12 the impedance of the battery and wiring is masked for all frequencies well above $f_1$. Any trouble due to self capacity of $L_{11}$ can be dealt with by further stages in the manner described for the progressive smoothing circuit. By making $L_{11}$ and $C_{13}$ large (that is by making $f_1$ low), the circuit becomes a smoothing circuit which may be used to smooth out any noise induced or arising in the battery 18.

Thus according to this aspect of the invention, with a source such as a battery having a regulation which is low and does not vary greatly with change of frequency, the regulation impedance can either be adjusted to a constant resistive value or can be masked and then adjusted.

It has been proposed to reduce the voltage regulation of generators or rectifiers by shunting across them an accumulator, glow discharge device, or other similar low resistance element. It may be found that even after this has been done the variation of resultant regulation impedance with frequency is more than can be tolerated. This frequency variation, or the effects of capacity and inductance in associated wiring, can be corrected in the manner described above for correcting the regulation of a battery.

In the foregoing, it has been assumed that the D. C. regulation of any device can be represented by a pure resistance. For many devices such as rectifiers and accumulators, this is not the case. The variation of voltage with load is not quite linear, especially for very small loads. Therefore when constructing a constant resistance building out circuit for such a device, a mean slope or value of regulation resistance should be taken. If it is required that the source and associated smoothing or masking circuits shall represent very closely a fixed resistance at all working frequencies and loads, it is sometimes advantageous to put a dead load across the source in order to stabilize its regulation resistance. For example, the first part of the regulation curve of a valve rectifier usually shows a much steeper slope than the rest of the curve. If now either a dead load is bridged across the rectifier, or the range of load currents required is so chosen that the rectifier is never required to work over the first steep portion of its regulation characteristic, it will be found that the effective regulation characteristic approximates more closely to a constant resistance.

Such a dead load may consist of a resistance or may be formed of thermionic triodes. Such triodes may for example be arranged to take a certain steady current at no useful load from the rectifier or other source, a suitable negative bias being applied to their grids. A reduction of source voltage due to load current raises the impedance of the triodes, thus tending to equalize the variation of source regulation resistance.

The resultant mean regulation of source and dead load combined is of course taken as the D. C. regulation to which the smoothing or masking circuit is built.

Although the invention has been described in some detail as applied to certain particular kinds of apparatus, it will be clear that it is applicable over a wide field in connection with the supply of electrical energy to apparatus operating at frequencies down to and including zero or operating with carrier oscillations modulated with a range of frequencies including zero frequency.

Further, the invention is not limited to cases where it is desired to compensate for the reactance of a smoothing filter associated with a source. It is also applicable, for example, to decoupling circuits where a desired drop of voltage is obtained by the provision of a series resistance in the lead to a point to be supplied and where undesired coupling between this point and other parts of the apparatus is prevented by a condenser located between the point and earth.

I claim:

1. Apparatus for the supply of electrical energy to a load which varies over a range of frequences, said apparatus comprising a source of electrical direct current, said source having a regulation impedance comprising a resistive direct current and a reactive component, of which the former determines the regulation for direct current and is of constant value for all frequencies of variation of said load, whereas the latter component is of different value at different frequencies of variation of said load, and means for preventing said reactive component from rising at any frequency within said range, to a value exceeding three times said resistive component.

2. Apparatus for the supply of electrical energy to a load which varies over a range of frequencies, said apparatus comprising a source of direct current, a pair of output terminals for connection to said load, a reactive impedance element associated with said source, said source and said impedance element being electrically coupled to said output terminals, and means for making the impedance viewed from said output terminals substantially resistive.

3. Apparatus for the supply of electrical energy to a load which varies over a range of frequencies, said apparatus comprising a source of direct current, a reactive impedance element associated with said source, said source and impedance element having a regulation impedance which has a reactive component due to said impedance element and a resistive component, and a second impedance element also having a reactive impedance component and being so connected and of such nature as to constitute a mirror image impedance with respect to the first mentioned impedance element.

4. Apparatus for the supply of electrical energy, said apparatus comprising a source of direct current having a regulation impedance which has a reactive component and a resistive component, a load, which varies over a range of frequencies extending effectively to zero, electrically associated with said source and an impedance element also having a reactive impedance component and being so connected and of such nature as to constitute a mirror image impedance with respect to the reactive component of said regulation impedance.

5. Apparatus according to claim 4, comprising a second impedance element also having a reactive impedance component and being so connected and of such nature as to constitute a mirror image impedance with respect to stray reactances associated with said source and the first mentioned impedance element.

6. Apparatus for the supply of electrical energy, said apparatus comprising a source of direct current having a regulation impedance which has a reactive component and a resistive component, a load, which varies over a range of frequencies extending effectively to zero, electrically associated with said source and an impedance element also having a reactive impedance component and being so connected and of such nature as to constitute a mirror image impedance with respect to the reactive component of said regulation impedance, said impedance element being of such nature and being associated with said source in such a manner that said source, viewed from said load, has a substantially resistive impedance.

7. Apparatus for the supply of electrical energy, said apparatus comprising a source of direct current having a regulation impedance which has a reactive component and a resistive component, a load, which varies over a range of frequencies extending effectively to zero, electrically associated with said source and an impedance element also having a reactive impedance component and being so connected and of such nature as to constitute a mirror image impedance with respect to the reactive component of said regulation impedance, said impedance element being of such nature and being associated with said load in such a manner as substantially to compensate for the variation in said regulation impedance due to the reactive component thereof.

8. Apparatus for the supply of electrical energy to a load, said apparatus comprising a source of current, a pair of output terminals for connection to said load and a multi-section filter connected between source and said terminals, each section of said filter comprising a series branch containing an inductance element and a shunt branch containing a capacity element, and the values of said inductances and capacities being such that the product of the inductance and capacity of the elements in one of said sections is greater than that of the elements in a second section further from said source than the first named section and the ratio of the inductance to the capacity of the elements in the first named section is not substantially greater than the ratio of the inductance and capacity in the second named section.

9. Apparatus according to claim 8, comprising means for compensating for capacity effectively in parallel with said output terminals.

10. Apparatus according to claim 8, comprising means for compensating for capacity effectively in parallel with said output terminals, said means comprising an inductance shunted by a resistance connected in series with respect to one of said output terminals and arranged close to this terminal.

11. Apparatus for the supply of electrical energy, said apparatus comprising a source of electrical energy, a pair of output terminals for connection to said load and between said source and said terminals a multi-section filter, each section of said filter having a series branch comprising inductance and a shunt branch comprising capacity, said inductances having stray capacity effectively in parallel therewith and the natural frequency of the inductance and capacity in one of said sections being lower than the natural frequency of the inductance together with the stray capacity effectively in parallel therewith in a second section nearer said source than the first mentioned section.

12. Apparatus for the supply of electrical energy to a load which varies over a range of frequencies, said apparatus comprising a pair of terminals for connection to said load, a source of direct current of which the direct current regulation resistance is so small as to have no appreciable adverse effect upon the constancy of the voltage maintained across said load at low frequencies, a smoothing circuit coupling said source to said terminals and damping means so disposed and of such value as to prevent the regulation impedance of said apparatus as a whole from rising, at any frequency within said range, to a value exceeding three times said direct current regulation resistance.

13. Apparatus for the supply of electrical energy to a load which varies over a range of frequencies, said apparatus comprising a pair of terminals for connection to said load, a source of direct current of which the direct current regulation resistance is so small as to have no appreciable adverse effect upon the constancy of the voltage maintained across said load at low frequencies and a smoothing circuit coupling said source to said terminals, the values of the elements of said smoothing circuit being such that the impedance of said apparatus, measured between said load terminals, at a resonant frequency of said elements is not more than twice the regulation resistance of said source.

14. Apparatus for the supply of electrical energy to a load which varies over a range of frequencies, said apparatus comprising a pair of terminals for connection to said load, a source of electrical energy which together with wiring and the like associated therewith has a regulation which approximates to a constant pure resistance up to a certain critical frequency but which changes above said critical frequency, said apparatus having, connected between said terminals and said source, a circuit for masking the impedance of said source and said wiring at frequencies within said range and above said critical frequency.

15. Apparatus for the supply of electrical energy to a load which varies over a range of frequencies, said apparatus comprising a pair of terminals for connection to said load, a battery which together with wiring and the like associated therewith has a regulation which approximates to a constant pure resistance up to a certain critical frequency but which changes above said critical frequency, said apparatus having, between said terminals and said battery, a circuit for masking the impedance of said battery and said wiring at frequencies within said range and above said critical frequency.

16. Apparatus according to claim 14, wherein said source is a generator shunted by an element of low resistance.

17. Apparatus according to claim 14, wherein said source is a rectifier shunted by an element of low resistance.

18. Apparatus for the supply of electrical energy to a varying load comprising a pair of terminals for connection to said load, a source of current connected to said terminals and having a direct current regulation resistance which varies more at small values of said load than at larger values thereof and having a reactive impedance, a dead load shunted across said source and corrective means for effectively neutralizing said reactive impedance whereby the impedance of said apparatus measured across said terminals is substantially purely resistive.

19. Apparatus according to claim 18, wherein said dead load comprises a thermionic valve connected in such a manner that the change of impedance of said valve with change of voltage tends to compensate for said variation in regulation resistance.

20. Apparatus for supplying electrical energy to a load which varies over a low range of frequencies comprising a pair of output terminals adapted to be connected to said load, a source of direct current connected to said terminals and having a small direct current regulation resistance of no appreciable adverse effect upon the constancy of voltage across said terminals, a reactive impedance element associated with said source and means for preventing the impedance of said apparatus viewed from said output terminals from rising at any frequency within said low range to a value exceeding three times the value of said direct current regulation resistance.

21. Apparatus for supplying electrical energy to a load which varies over a range of frequencies comprising a pair of output terminals adapted to be connected to said load, a source of direct current connected to said terminals, said source having a regulation impedance which has a reactive component, and means for making the impedance viewed from said terminals substantially resistive over said range of frequencies.

ALAN DOWER BLUMLEIN.